United States Patent
Burkitt

(10) Patent No.: US 8,089,336 B2
(45) Date of Patent: Jan. 3, 2012

(54) POSITION DETECTION

(75) Inventor: John Burkitt, Woking (GB)

(73) Assignee: Peratech Limited, Richmond (GB)

( * ) Notice: Subject to any disclaimer, the term of this patent is extended or adjusted under 35 U.S.C. 154(b) by 915 days.

(21) Appl. No.: 12/114,179

(22) Filed: May 2, 2008

(65) Prior Publication Data

US 2008/0289886 A1 Nov. 27, 2008

(30) Foreign Application Priority Data

May 2, 2007 (GB) ................................. 0708439.5

(51) Int. Cl.
*H01C 10/10* (2006.01)
*H01C 10/12* (2006.01)

(52) U.S. Cl. .......................... 338/101; 338/99; 338/114

(58) Field of Classification Search .................. 338/99, 338/110–112, 114, 115, 208, 334; 200/511–512
See application file for complete search history.

(56) References Cited

U.S. PATENT DOCUMENTS

| | | | |
|---|---|---|---|
| 6,504,531 B1 * | 1/2003 | Sandbach | 345/173 |
| 6,714,117 B2 * | 3/2004 | Sandbach | 338/101 |
| 7,301,435 B2 * | 11/2007 | Lussey et al. | 338/13 |
| 2002/0180578 A1 | 12/2002 | Sandbach | |

FOREIGN PATENT DOCUMENTS

| | | |
|---|---|---|
| WO | 01/75924 A1 | 10/2001 |
| WO | 02/052391 A2 | 7/2002 |
| WO | 2005/091319 A1 | 9/2005 |

* cited by examiner

*Primary Examiner* — Kyung Lee

(74) *Attorney, Agent, or Firm* — Harness, Dickey & Pierce, P.L.C.

(57) ABSTRACT

Apparatus for detecting the position of the mechanical interaction is disclosed. A first fabric conducting layer (601) has electrically conducting fibers, electrically conducting tracks (602, 603) and terminals (604) connectable to a circuit. A second fabric layer (605) has conducting fibers and insulating fibers. A third separating layer (608) is constructed from an insulator with openings to allow conduction to occur. A forth fabric conducting layer (609) also has electrically conducting fibers, electrically conducting tracks (610, 611) and terminals connectable to a circuit. The second fabric (605) is a knitted fabric having a substantially smooth back (606) and an irregular front (607). The knitted fabric is positioned such that the irregular surface is in contact with the first conducting layer and the smooth surface is in contact with the separating layer (608).

21 Claims, 10 Drawing Sheets

POSITION DETECTION

CROSS REFERENCE TO RELATED APPLICATIONS

This application represents a first patent application directed towards the technology, from which priority may be subsequently claimed.

TECHNICAL FIELD

The present invention relates to apparatus for detecting the position of a mechanical interaction.

BACKGROUND OF THE INVENTION

A detector constructed from fabric is disclosed in international patent publication WO 00/72239. In this patent publication, the problem of false triggering is identified; usually resulting from a fabric detector having been folded to some extent. A solution is provided by the provision of five fabric layers in which two outer layers and a central layer are conductive and between each of these are provided insulating layers. It is therefore necessary for a mechanical interaction to exert pressure through two insulating layers and as a result of this false triggering does not occur and the fabric sensor may be folded without it producing an erroneous output signal.

The present applicant has identified a problem with the five layer system described above. The presence of the numerous layers and the requirement for two conducting layers to be acted upon in order to achieve conduction, means that the level of mechanical pressure required in order to achieve electrical conduction tends to vary between positions on the detector itself. The insulating layers usually take the form of nets and as such both of these layers will contribute to the variation in activation force, thereby increasing the overall variation over the device. Thus, if the detector is used to provide a keyboard for example, it may be necessary to apply different levels of pressure on different keys in order for the key to register as being pressed. Consequently in use, this tends to result in pressed keys not registering and accidental presses registering as key presses. The result often expresses itself as erroneous typing and clearly this is seen as a disadvantage when compared to the use of standard mechanical keyboards.

BRIEF SUMMARY OF THE INVENTION

According to an aspect of the present invention, there is provided apparatus for detecting the position of a mechanical interaction, comprising: a first fabric conducting layer having electrically conducting fibres, electrically conducting tracks and terminals connectable to a circuit; a second fabric layer having conducting fibres and insulating fibres; a third separating layer constructed from an insulator with openings therein to allow conduction to occur between said openings when pressure is applied; and a forth fabric conducting layer having electrically conducting fibres, electrically conducting tracks and terminals connectable to a circuit; wherein: said second fabric is a knitted fabric having a substantially smooth back and an irregular front; and the knitted fabric is positioned such that said irregular surface is in contact with said first conducting layer and said smooth surface is in contact with said separating layer.

In a preferred embodiment, the third separating layer is a knitted layer of insulating material.

Preferably, the second fabric (the knitted fabric) is produced by a process of warp knitting. Similarly, the knitted insulating layer may also be produced by a process of warp knitting.

Preferably, the conductive fibres in the conductive elements are conductive monofilaments.

According to a second aspect of the present invention, there is provided a method of detecting the position of a mechanical interaction, in which pressure is applied to an apparatus constructed substantially from fabric, said method comprising the steps of: applying manual pressure to a detector; and measuring current in response to applied voltages to determine the position of said mechanical interaction, wherein said mechanical interaction forces a plurality of fabric layers into close contact to thereby facilitate the transmission of said electrical current, wherein said layers consist of a first fabric conducting layer having electrically conducting fibres, a second fabric layer having conducting fibres and insulating fibres, a third separating layer constructed from an insulator with openings therein to allow conduction to occur, and a forth fabric conducting layer having electrically conducting fibres, wherein said second fabric layer is a knitted fabric having a substantially smooth back and an irregular front, and said knitted fabric is positioned such that said irregular surface is in contact with said first conducting layer and said smooth surface is in contact with said separating layer.

In a preferred embodiment, pressure is applied by the application of a finger being pressed against the apparatus. Preferably, said finger press occurs in order to control an electronic device or to supply data to an electronic device. The electronic device may be a computer, a hand-held computer, a mobile telephone, an audio player, a video player or a digital camera etc.

DESCRIPTION OF THE BEST MODE FOR CARRYING OUT THE INVENTION

FIG. 1

Figure 1:
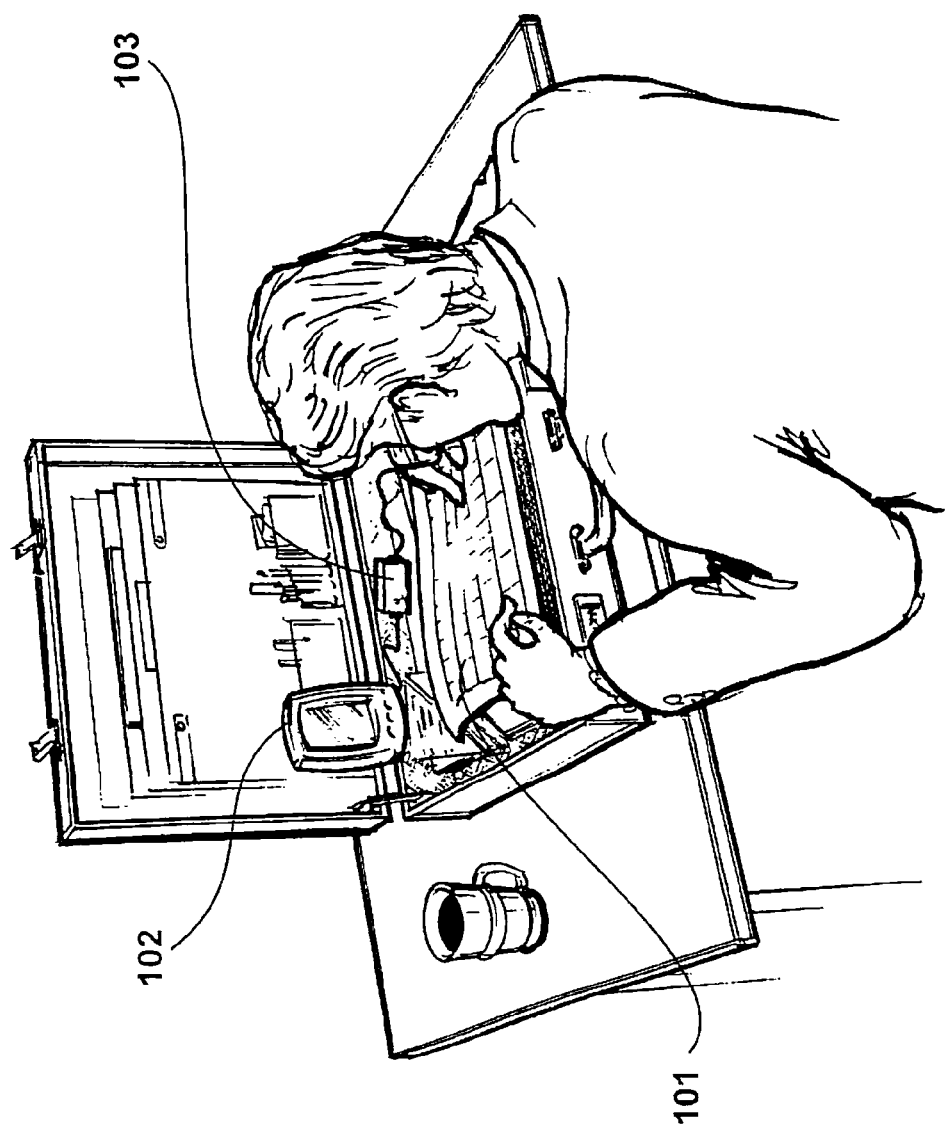
FIG. 1 shows apparatus for detecting a position of the mechanical interaction in the form of a fabric keyboard.

FIG. 1 shows a fabric keyboard, which may be considered as an example of apparatus for detecting the position of a mechanical interaction. In this example, a fabric keyboard 101 is communicating with a hand-held processor 102 via an interface device 103. In this way, it is possible to use the keyboard 101 so as to provide alphanumeric characters to the processing device 102.

FIG. 2

Figure 2:
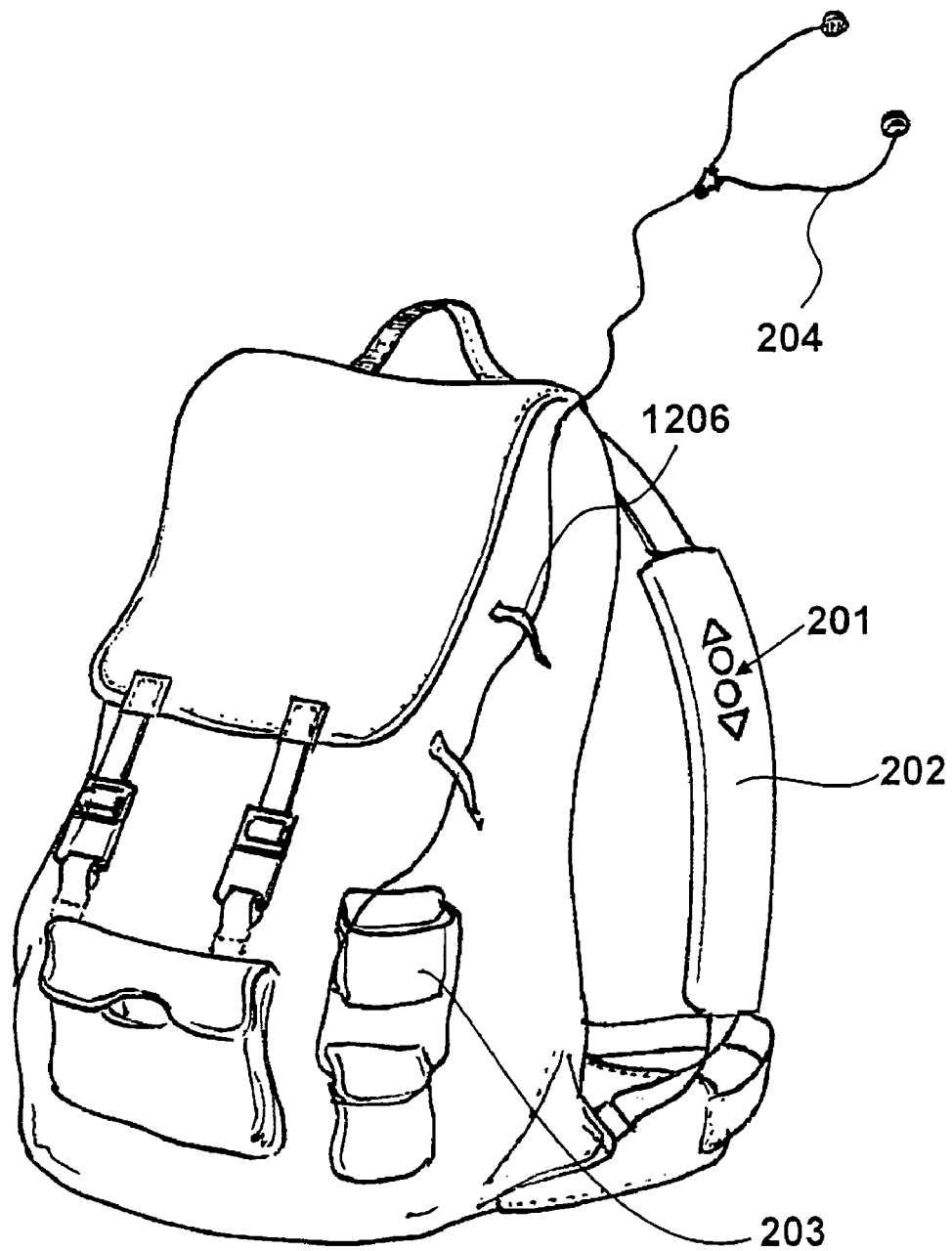
FIG. 2 shows an alternative application for the detection apparatus.

FIG. 2 shows an alternative application for the detection apparatus. In this example, the detecting apparatus 201 is included as part of a carrying strap 202 of a rucksack. In this embodiment, an audio player is restrained within a pocket 203 and audio signals are conveyed to a user via headphones 204. Furthermore, detection apparatus embodying the present invention may also be deployed in items of clothing, such as jackets or trousers etc in addition to items of apparel such as bags or rucksacks.

FIG. 3

Figure 3:
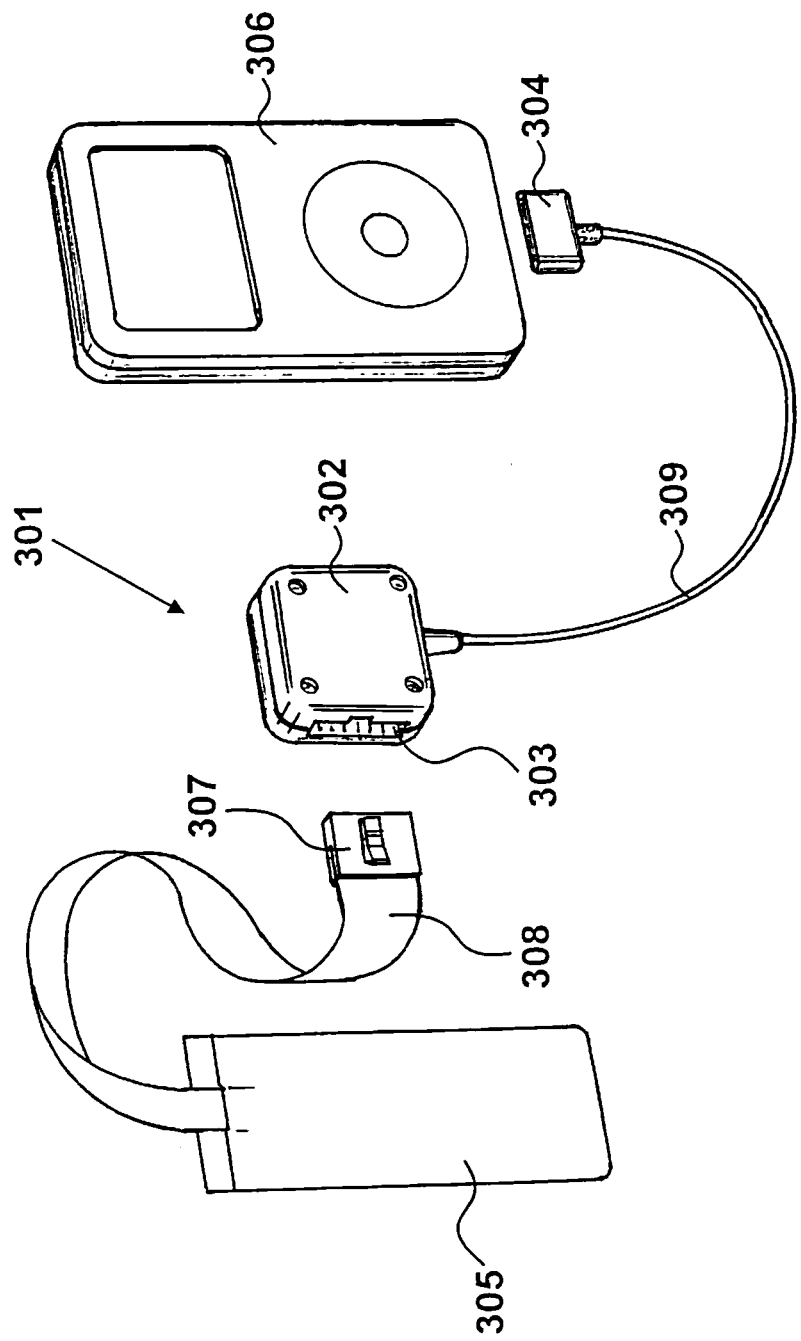
FIG. 3 illustrates an interface device.

FIG. 3 shows a preferred application in which an interface device 301 is provided having a processing circuit with analog ports and control ports. The processing circuit includes a housing 302 for enclosing the processing circuit and for supporting a first physical interface 303 and a second physical interface 304. The first physical interface 302 is connected to the analog ports of the processing circuit and is also connectable to a fabric sensor 305, embodying the preferred aspects of the present invention. The second physical interface 304 is connected to the control ports of the processing circuit and is also connectable to an electronic device, such as an audio player 306, such that when an electronic device is connected to the interface device 301 it is possible for the electronic device 306 to be controlled by manual operation of the fabric sensor 305.

It is possible for the first physical interface to take the form of a socket 303 into which a plug 307 is received; the plug itself receiving connections 308 from the fabric sensor 305. The second physical interface may take the form of a cable 309 that extends from the housing 302 so as to be connected to a plug 304 insertable into the electronic device 306.

FIG. 4

Figure 4:
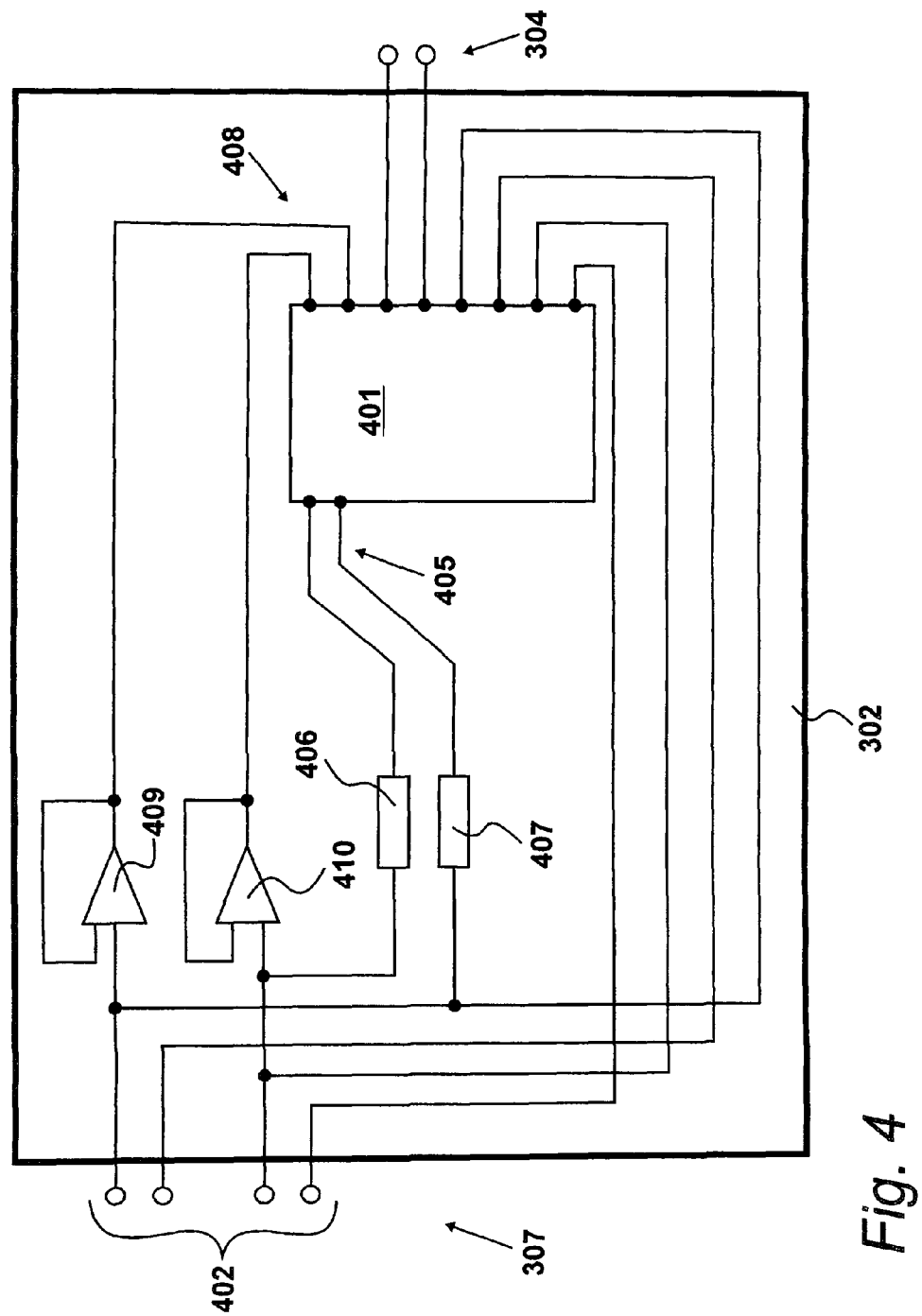
FIG. 4 shows internal components of the interface device of FIG. 3.

FIG. 4 shows internal components of the interface device 301. Interface 307 is shown extending from the housing 302 as a connection to the left and interface 304 is shown as connections extending from the right of the housing 302. Furthermore, the number of connections established by interface 304 may vary depending upon the particular application.

A processor 401 (preferably a microcontroller) supplies voltages to connectors 402. Resistors 406 and 407 have resistances that are substantially similar to the resistance of the fabric detector, measured from a first conducting layer to the opposite conducting layer when a typical target pressure has been applied. The detection process is controlled by a program executed by the microcontroller 401 that is in turn configured to supply output voltages at pins 405 and to receive analog input voltages at input pins 407 via high impedance buffers 409 and 410.

FIG. 5

Figure 5:
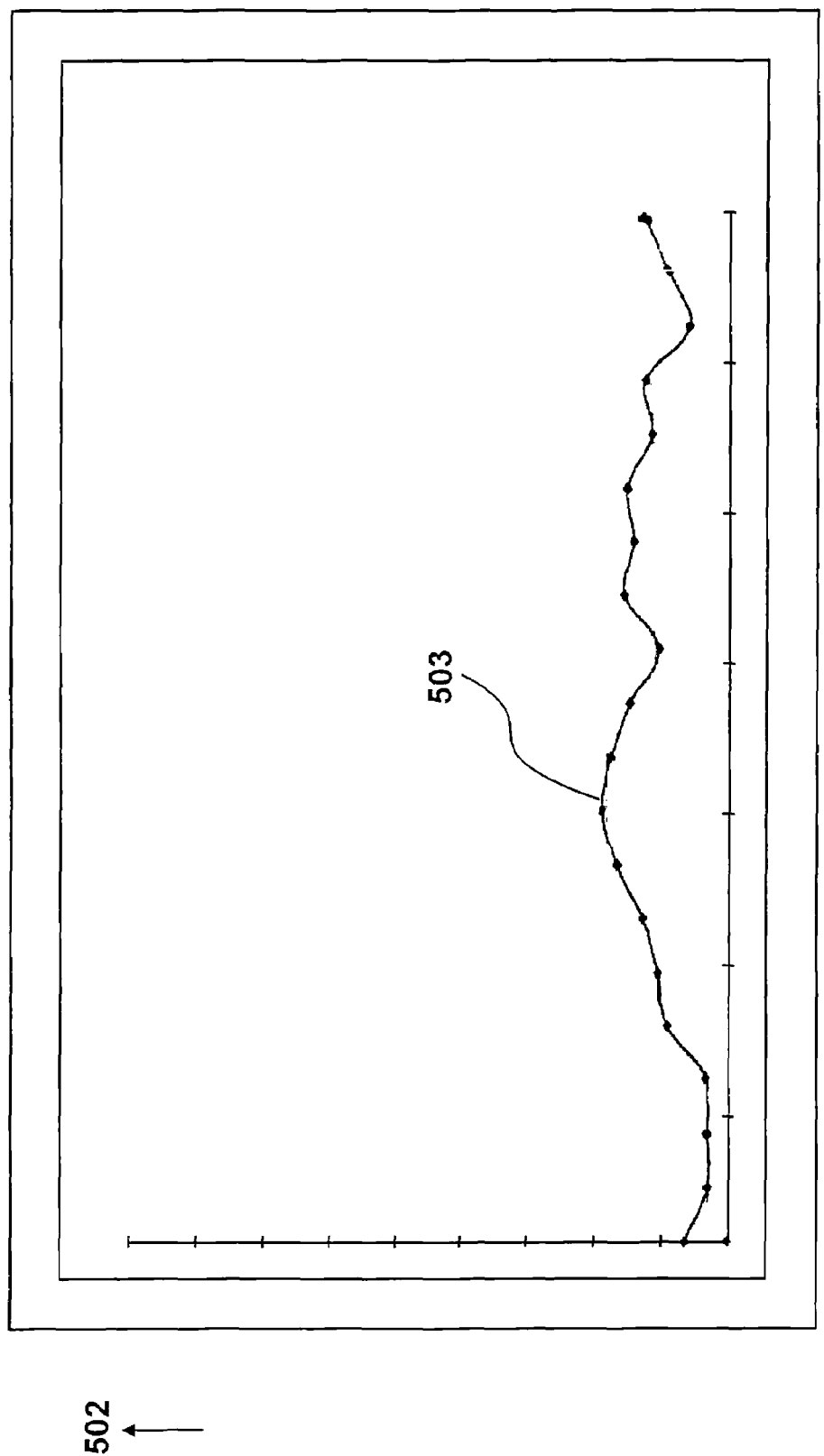
FIG. 5 illustrates a characteristic of a known sensor.

FIG. 5 illustrates that it is possible to perform a test on a known sensor to determine the level of pressure required over an active area of the sensor. A resulting graph for a known five-layer system is illustrated in FIG. 5. Activation force is plotted along the x axis 501 representing the amount of pressure required in order for activation to occur. Frequency, that is the number of presses that scored a particular level of activation force, is plotted along the y axis 502. The resulting distribution 503 is relatively spread-out over a range of force showing that the sensitivity of the device is quite variable which as previously described, may result in less than perfect operation when supplying data to a processing device.

FIG. 6

Figure 6:
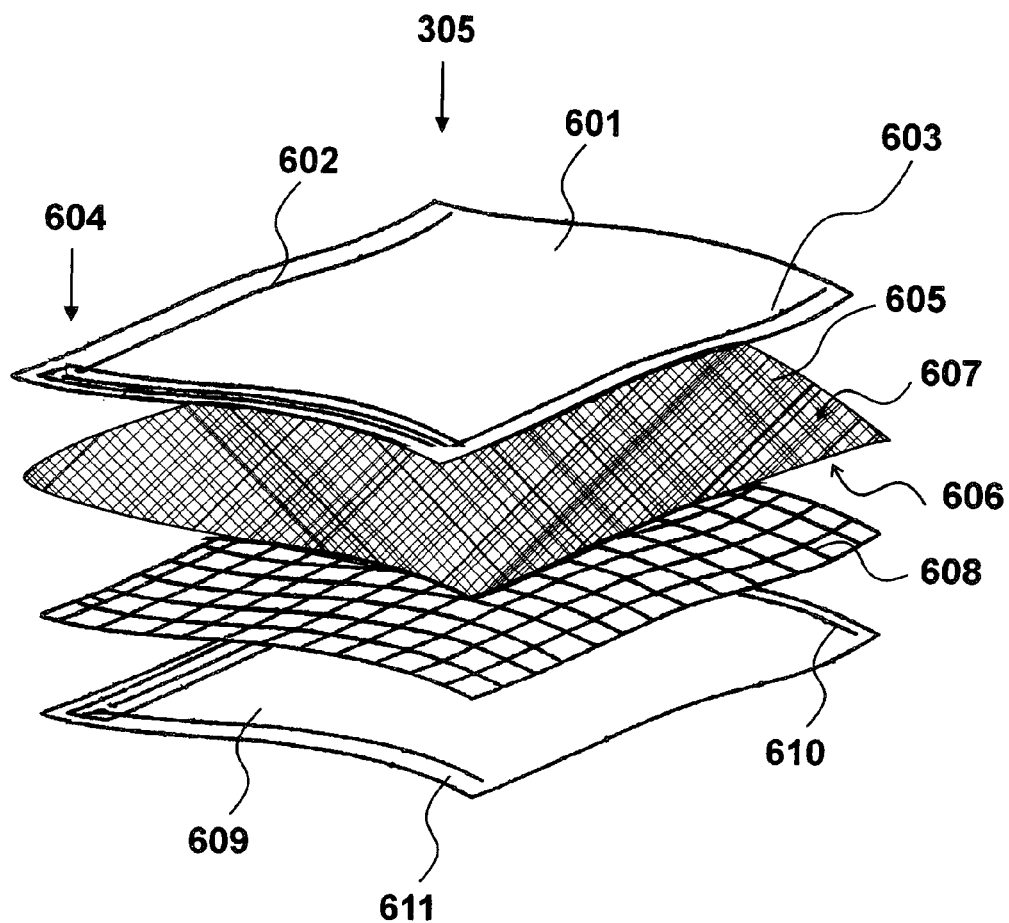
FIG. 6 illustrates an embodiment of the present invention.

FIG. 6 illustrates a detection apparatus embodying the present invention, in exploded view. The detector has a first fabric conducting layer 601 having electrically conducting fibres, electrically conducting tracks 602, 603 and terminals 604 connectable to the processing circuit shown in FIG. 4. The conductive fibres are preferably a conductive monofilament.

A second fabric layer 605 has conducting fibres and insulating fibres. This second fabric layer is a knitted fabric having a substantially smooth back 606 and an irregular front 607. This layout is preferably a knitted tricot construction with both conducting and insulating monofilaments.

A third separating layer 608 is constructed from an insulator with openings therein to allow conduction to occur between said openings when pressure is applied. In a preferred embodiment this separating layer is implemented as a net, possibly constructed from a knitted plastics material.

A forth fabric conducting layer 609 is similar to the first fabric conducting layer, having electrically conducting fibres, electrically conducting tracks 610, 611 and terminals, again connectable to a processing circuit, such as that shown in FIG. 4.

The knitted fabric 606 is positioned such that its irregular front surface is in contact with the first conducting layer and its smooth back surface is in contact with the separating layer. In this way, a good electrical contact is provided between the knitted layer and the insulating layer, thereby providing a degree of uniformity, such that the activation force is spread over a much lower range compared to the known five layer systems.

The irregular front face of the knitted layer is less critical to operational sensitivity. It provides an adequate degree of separation, but at the same time gives good electrical contact when pressure is applied, given the high conductivity of the first layer.

FIG. 7

Figure 7:
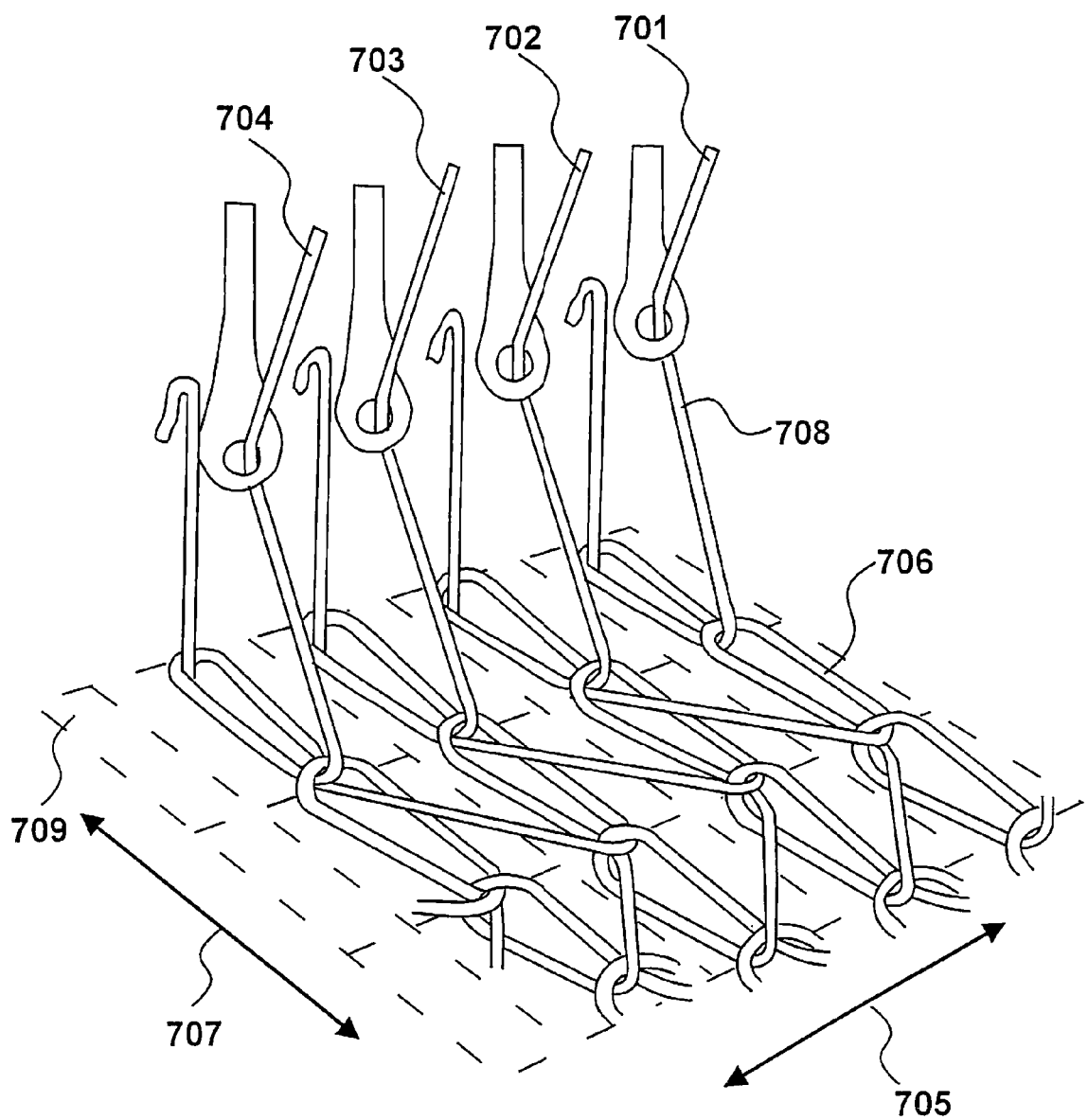
FIG. 7 illustrates a knitting process.

FIG. 7 shows an example of a knitted layer 606. In a preferred embodiment the knitted layer 606 is produced by a process of Raschel or Tricottype warp knitting. The warp knit is produced on a flat bed machine with several independent yarns 701 to 704 running along the length of the warp. The number of threads present defines the number of wales which in turn defines the width of the fabric as illustrated by arrow 705.

The knitting process involves defining loops, such as loop 706 with each row of loops defining a single course. Thus, the courses extend along the length of arrow 707.

The knitting process involves pulling a thread, such as thread 708 through a loop, such as loop 706. The loops lie flat against a bed 709 and the threads and resulting knots extend therefrom in an upwards direction. Thus, the upper surface as shown in FIG. 7 results in the generation of the technical face with the under surface, supported by bed 709 representing the technical back. As is known in the art, the technical back presents a substantially smooth plane which, in accordance with this invention is placed in contact with the insulating separating layer.

The presence of the extending knots on the technical face create irregularities and in accordance with the present invention, the irregular face is placed in contact with the first conducting layer. Thus, this close co-operation with the conducting layer ensures that good electrical contact is maintained when pressure is applied, irrespective of the position of the pressure. Thus, the irregularities of the knitted face are compensated by the smooth attributes of the first conducting layer. Similarly, the irregularities of the insulating layer 608 are compensated by the smooth presence of the back of the knitted layer 607. Consequently, in this way, it is possible for the attributes of the knitted layer 607, namely the presence of a technical face with irregularities and the presence of a technical back with a smooth presentation, to enable a four-layer detector to be produced which has desirable properties in terms of the amount of force required in order for contact to be achieved.

FIG. 8

Figure 8:
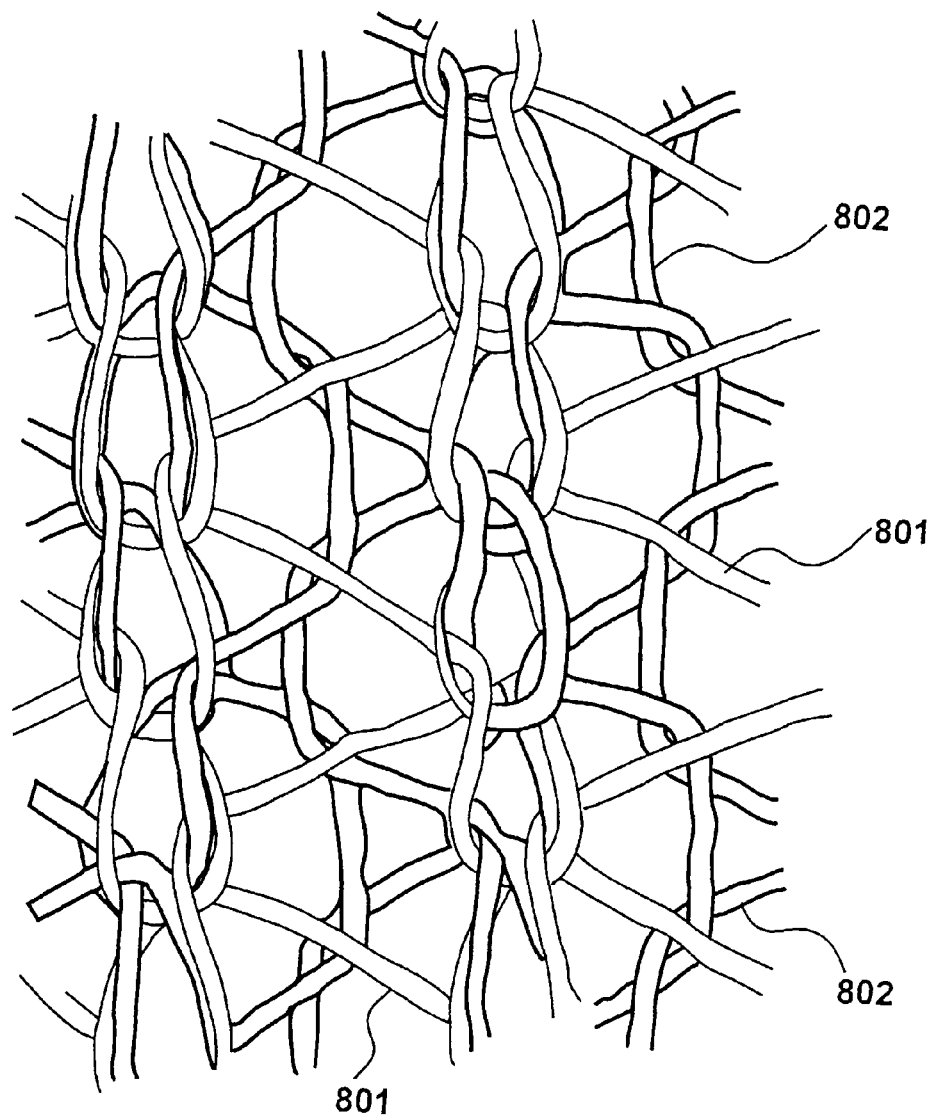
FIG. 8 shows an example of a knit produced by the process illustrated in FIG. 7.

FIG. 8 shows an example of a knit produced by the process identified in FIG. 7. The knit includes insulating yarns 801 and conducting yarns 802. The conducting yarns ensure that it is possible for electrical current to flow in the plane of the knit. In this way, it is possible for the knit to provide the required functionality within the detector.

In addition, the presence of insulating yarns ensure that insulation is maintained in situations when manual pressure has not been applied.

In accordance with the preferred feature of the invention, the plane back surface facilitates good conduction. However, the raised knots 803 provide the required level of insulation when pressure is not being applied.

FIG. 9

Figure 9:
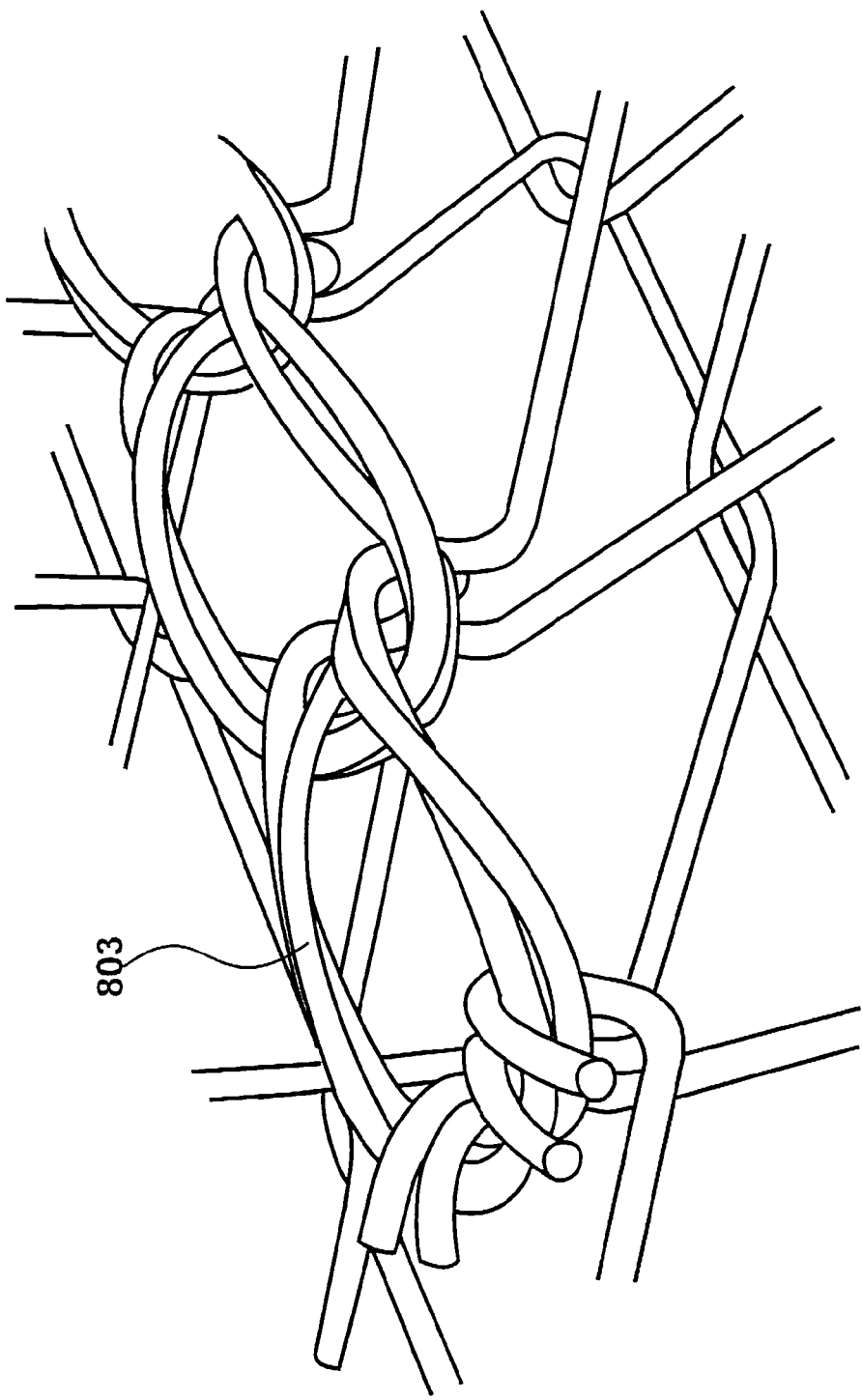
FIG. 9 shows the knit of FIG. 8 in greater detail.

FIG. 9 shows a close up view of the knitted construction. In particular, raised loops 803 are present which give the knitted structure a three-dimensionality and ensure that separation is maintained between the conductive layers. As previously stated, the under back surface is substantially smooth and thereby facilitates a uniform response. However, the raised front surface, due to the presence of loops 803, ensures that spacing is provided so as to ensure insulation and non-conduction in the absence of pressure being applied to the detector.

FIG. 10

Figure 10:
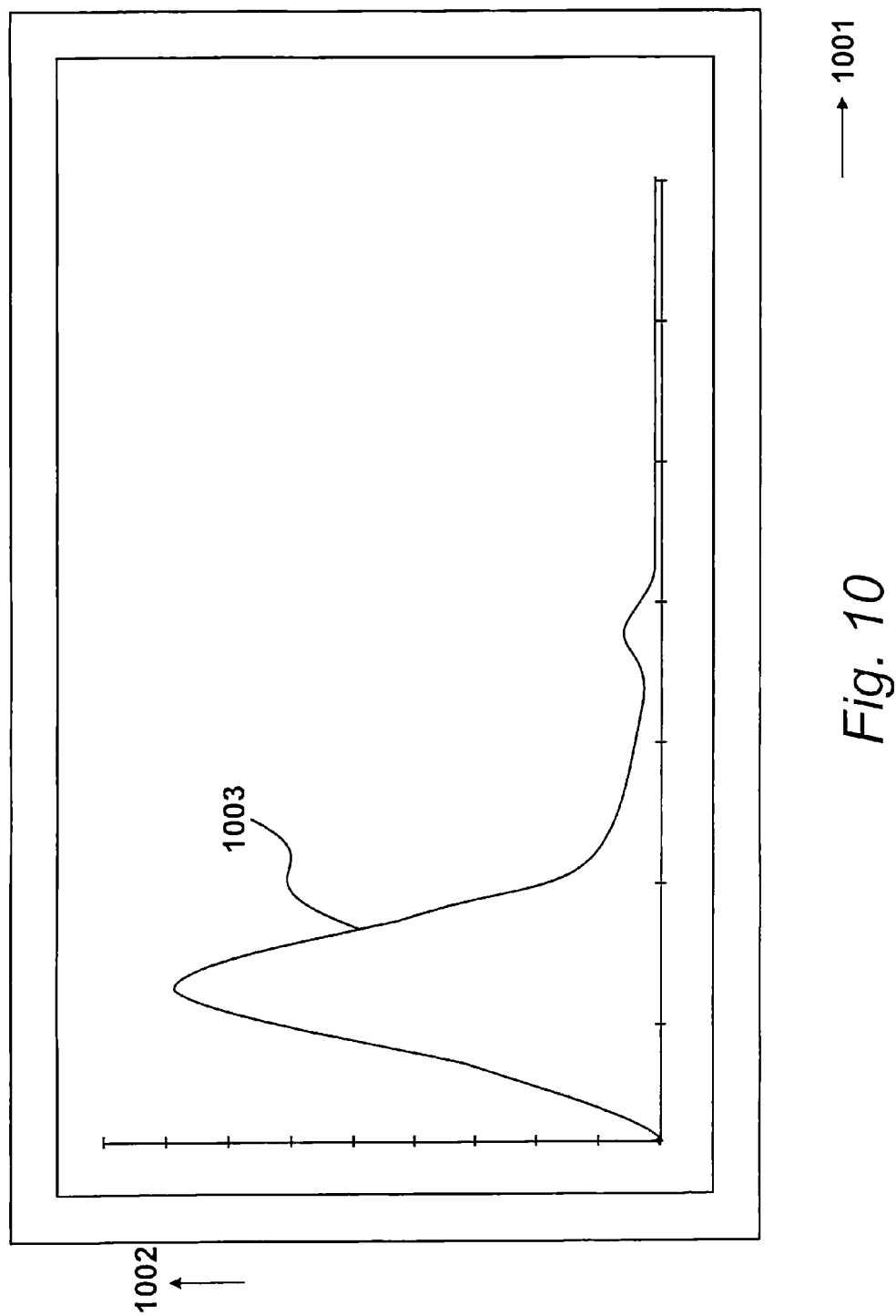
FIG. 10 illustrates a response characteristic of a preferred embodiment.

FIG. 10 illustrates the desirable properties of the four-layer system. Axis 801 and 802 are substantially similar to axes 501 and 502 in FIG. 5. In this example, the response curve 803 is significantly different from response curve 503. In particular, the active range, that is the range over which activation takes place, is relatively narrow resulting in the presence of a peak where most activations occur. In operation, the detector has a response which is far less variable therefore it is easier from an operative to become familiar with the amount of force required in order for activation to occur. Similarly, in other applications, such as measuring applications the responsiveness of the detector ensures that the detector is easier to calibrate and as such its range of application may be increased.

The invention claimed is:

1. Apparatus for detecting the position of a mechanical interaction, comprising
    a first fabric conducting layer having electrically conducting fibres, electrically conducting tracks and terminals connectable to a circuit;
    a second fabric layer having conducting fibres and insulating fibres;
    a third separating layer constructed from an insulator with openings therein to allow conduction to occur between said openings when pressure is applied; and
    a fourth fabric conducting layer having electrically conducting fibres, electrically conducting tracks and terminals connectable to a circuit; wherein:
    said first fabric conducting layer and said fourth fabric conducting layer are only separated by said second fabric layer and said third separating layer;
    said second fabric is a knitted fabric having a substantially smooth back surface and an irregular front surface comprising raised knots; and
    said knitted fabric is positioned such that said irregular front surface is in contact with said first conducting layer and said smooth back surface is in contact with said separating layer, and
    said raised knots provide insulation in the absence of pressure being applied.

2. Apparatus according to claim 1, wherein said mechanical interaction occurs due to a finger being pressed against the apparatus.

3. Apparatus according to claim 2, wherein said finger press occurs in order to control an electronic device or to supply data to an electronic device.

4. Apparatus according to claim 3, wherein said electronic device is a computer, a hand-held computer, a mobile telephone, an audio player, a video player or a digital camera, et cetera.

5. Apparatus according to claim 1, forming part of an item of clothing (jacket, trousers etc) or an item of personal apparel, such as a hand bag, computer bag or rucksack.

6. Apparatus according to claim 5, wherein said apparatus controls an electronic device supported by said item of clothing or said item of apparel via a removable interface device.

7. Apparatus according to claim 1, wherein said electrically conducting fibres include carbon or metallic (eg. gold, silver or copper) constituents.

8. Apparatus according to claim 1, wherein the third separating layer is a knitted layer of insulating material.

9. Apparatus according to claim 1, wherein said knitted fabric is produced by a process of warp knitting.

10. Apparatus according to claim 1, wherein the electrically conductive fibres in the conducting layers are conductive monofilaments.

11. A method of detecting the position of a mechanical interaction, in which pressure is applied to an apparatus constructed substantially from fabric, said method, comprising the steps of:
    applying manual pressure to a detector; and
    measuring currents in response to applied voltages to determine the position of said mechanical interaction, wherein
    said mechanical interaction forces a plurality of fabric layers in to close contact to thereby facilitate the transmission of said electrical current, wherein said layers consist of a first fabric conducting layer having electrically conducting fibres, a second fabric layer having conducting fibres and insulating fibres, a third separating layer constructed from an insulator with openings therein to allow conduction to occur, and a fourth fabric conducting layer having electrically conducting fibres, wherein
    said first fabric conducting layer and said fourth fabric conducting layer are only separated by said second fabric layer and said third separating layer,
    said second fabric layer is a knitted fabric having a substantially smooth back surface and an irregular front surface comprising raised knots, and
    said knitted fabric is positioned such that said irregular front surface is in contact with said first conducting layer and said smooth back surface is in contact with said separating layer, and
    said raised knots provide insulation in the absence of pressure being applied.

12. A method according to claim 11, wherein said mechanical interaction occurs due to a finger being pressed against the apparatus.

13. A method according to claim 12, wherein said finger press occurs in order to control an electronic device or to supply data to an electronic device.

14. A method according to claim 13, wherein said electronic device is a computer, a hand-held computer, a mobile telephone, an audio player, a video player or a digital camera etc.

15. A method of constructing apparatus for detecting the position of a mechanical interaction, comprising the steps of:
locating a first fabric conducting layer having electrically conducting fibres, electrically conducting tracks and terminals connectable to a circuit;
positioning a second fabric layer having conducting fibres and insulating fibres over said first fabric conducting layer;
applying a third separating layer constructed from an insulator with openings therein over said second fabric layer;
arranging a fourth fabric conducting layer having electrically conducting fibres over said third separating layer, wherein
said first fabric conducting layer and said fourth fabric conducting layer are only separated by said second fabric layer and said third separating layer;
said second positioned fabric layer is a knitted fabric having a substantially smooth back surface and an irregular front surface comprising raised knots in which said positioning occurs such that said irregular front surface is in contact with said first located layer and said smooth surface is in contact with said third applied separating layer, and said raised knots provide insulation in the absence of pressure being applied.

16. A method according to claim 15, further comprising the step of attaching said apparatus to an item of clothing (a jacket or trousers etc) or an item of personal apparel, such as a hand bag, computer bag or rucksack.

17. A method according to claim 16, wherein an electronic device is supported by said item of clothing or said item of apparel and the apparatus is used to control said electronic device.

18. A method according to claim 15, wherein said electrically conducting fibres include carbon or metallic (eg gold, silver or copper) constituents.

19. A method according to claim 15, wherein the third separating layer is a knitted layer of insulating material.

20. A method according to claim 15, wherein said knitted fabric is produced by a process or warp knitting.

21. A method according to claim 15, wherein said electrically conductive fibres in the conducting layers are conductive monofilaments.

* * * * *